US007584546B2

(12) United States Patent
Chabot et al.

(10) Patent No.: US 7,584,546 B2
(45) Date of Patent: Sep. 8, 2009

(54) ALIGNMENT CONTROL FOR A WATER-JET CUTTING SYSTEM

(75) Inventors: Jean-Francois Laurent Chabot, Melun (FR); Alexis Perez-Duarte, Bourg la Reine (FR); Kadour Raissi, Paris (FR)

(73) Assignee: SNECMA, Paris (FR)

( * ) Notice: Subject to any disclaimer, the term of this patent is extended or adjusted under 35 U.S.C. 154(b) by 16 days.

(21) Appl. No.: 12/035,755

(22) Filed: Feb. 22, 2008

(65) Prior Publication Data

US 2008/0201973 A1 Aug. 28, 2008

(30) Foreign Application Priority Data

Feb. 28, 2007 (FR) .................................. 07 01422

(51) Int. Cl.
*G01B 5/25* (2006.01)
*B05B 1/10* (2006.01)
*B05B 1/26* (2006.01)

(52) U.S. Cl. ........................... 33/533; 33/645; 239/589

(58) Field of Classification Search .................. 33/412, 33/529, 533, 613, 645; 239/461, 589
See application file for complete search history.

(56) References Cited

U.S. PATENT DOCUMENTS

| | | | | |
|---|---|---|---|---|
| 3,314,612 | A * | 4/1967 | Anthens et al. | 239/589 |
| 3,620,457 | A * | 11/1971 | Pearson | 239/589 |
| 4,222,173 | A * | 9/1980 | Hall | 33/533 |
| 4,538,355 | A * | 9/1985 | Morghen | 33/613 |
| 5,320,289 | A | 6/1994 | Hashish et al. | |
| 6,334,581 | B1 * | 1/2002 | Lai et al. | 239/589 |
| 6,729,561 | B2 * | 5/2004 | Hirae et al. | 239/589 |
| 7,458,169 | B1 * | 12/2008 | Coope et al. | 33/645 |
| 2003/0085295 | A1 * | 5/2003 | Dijkman et al. | 239/589 |
| 2003/0132325 | A1 * | 7/2003 | Michael | 239/589 |

FOREIGN PATENT DOCUMENTS

| | | | |
|---|---|---|---|
| WO | WO 01/03887 | A1 | 1/2001 |
| WO | WO 03/011524 | A1 | 2/2003 |

* cited by examiner

*Primary Examiner*—G. Bradley Bennett
(74) *Attorney, Agent, or Firm*—Oblon, Spivak, McClellland, Maier & Neustadt, P.C.

(57) ABSTRACT

Device for checking the alignment of a water jet in a water-jet cutting system, comprising means for positioning an annular element at the outlet of a focusing tube, at some distance from this outlet and aligned with respect to the axis of this focusing tube, this annular element having an internal diameter equal to that of the internal channel of the focusing tube.

8 Claims, 2 Drawing Sheets

ALIGNMENT CONTROL FOR A WATER-JET CUTTING SYSTEM

BACKGROUND OF THE INVENTION

The present invention relates to a device and a method for checking the alignment of a water-jet cutting system.

DESCRIPTION OF THE PRIOR ART

Water-jet cutting systems are widely used for cutting all sorts of materials. Pure water may be sufficient if the materials to be cut are relatively soft or thin, but for cutting harder and thicker materials, the water must however be mixed with an abrasive powder so as to obtain a more powerful jet.

Cutting systems using a jet of abrasive-laden water comprise a pressurized-water intake connected to the inlet of a cutting head, which generally comprises a collimating tube intended to conduct the pressurized water to a water-jet-forming nozzle which is housed in the outlet of this collimating tube and emerges in a mixing chamber where the abrasive powder is introduced by suction. The abrasive-laden water jet leaving the mixing chamber then passes into the cylindrical channel of a focusing tube. The downstream end of the collimating tube, the jet-forming nozzle and the upstream end of the focusing tube are supported by a body in which the mixing chamber is also formed.

For high-performance cutting of good quality, including for parts of relatively large thickness, such cutting systems must deliver a water jet that is stable over time and the energy of which is as high as possible.

An unstable or insufficiently powerful water jet runs the risk of compromising the speed and precision of the cutting, with the risk of causing a loss of quality in the cut parts.

However, in these systems, the energy and the stability of the water jet may be greatly affected by the quality of alignment of the axis of the jet-forming nozzle with the axis of the focusing tube, especially because a misalignment is liable to cause substantial pressure drops in the focusing tube and cause divergence or dispersion of the jet.

The quality of alignment of the jet-forming nozzle with the focusing tube may also have an impact on the lifetime of the tube, a misalignment running the risk of causing premature wear of the tube owing to larger collisions between the jet and the internal wall of this tube.

Correct alignment of the axis of the jet-forming nozzle with the axis of the focusing tube depends mainly on the dimensional quality of the parts making up the cutting head, in particular the nozzle, the tube and the head body, but also on the quality of the fitting of the nozzle in its housing, this fitting generally consisting in pressing this nozzle with great pressure into this housing. The quality of such a fitting may be substantially compromised by the presence of undesirable bodies, such as abrasive powder grains which could get between the nozzle and the walls against which this nozzle is pressed.

Now, at the present time there is no means for checking the quality of alignment of the jet-forming nozzle with the focusing tube, except by carrying out timed drillings in order to evaluate the energy of the abrasive water jet, which are lengthy and somewhat imprecise trials.

The object of the invention is to provide a simple, inexpensive and effective solution to this problem.

SUMMARY OF THE INVENTION

The subject of the invention is a device and a method that make it possible to check the alignment of the water jet, and therefore the alignment of the axis of the jet-forming nozzle with the axis of the focusing tube, with means that are simple, inexpensive and quickly implemented.

For this purpose, the invention provides a device for checking the alignment of a water jet in a water-jet cutting system which comprises a pressurized water inflow, a nozzle for forming the water jet, said nozzle opening into an abrasive powder intake chamber, and a focusing tube mounted on the outlet of this chamber, this focusing tube having an internal cylindrical channel of constant diameter for passage of the water jet, which device includes means for positioning an annular element on the outlet of the focusing tube, at a certain distance from this outlet and aligned with respect to the axis of the focusing tube, this annular element having an internal diameter equal to that of the internal channel of the focusing tube.

Owing to its positioning and its internal diameter, this annular element makes it possible to test the alignment of the water jet output by the focusing tube. This is because if the water jet is correctly aligned, it must pass through the center of the annular element without coming into contact with this element. However, in the event of misalignment, the annular element constitutes an obstacle for at least part of the water jet, which will therefore rebound upon contact with this annular element. The presence or absence of a rebound therefore provides information about the quality of the water jet, and consequently about the quality of alignment of the axis of the jet-forming nozzle with the axis of the focusing tube.

According to a preferred embodiment, the annular element is formed by the downstream end of a cylindrical tubular end-piece fixed, for example screwed or fitted, to the downstream end of the focusing tube.

This embodiment offers a simple means of fitting and removing the annular element, which is incorporated into the tubular end-piece, while still guaranteeing that it is correctly positioned thanks to the rigidity of this tubular end-piece.

The tubular end-piece advantageously includes an internal cylindrical channel for passage of the water jet, this channel having a diameter greater than that of the internal channel of the focusing tube and terminating at its downstream end in an internal shoulder forming the annular element.

The larger diameter of the channel of the end-piece prevents this channel from acting as an extension of the focusing tube and makes the annular element intended to test for the alignment of the water jet inoperable.

According to another feature of the invention, the tubular end-piece includes at least one window formed in its cylindrical wall near its downstream end.

This window makes the checking of the alignment more reliable, by providing a lateral discharge path for at least part of the water jet in the event of misalignment.

The device according to the invention also includes means for reducing the water feed pressure and means for reducing the water feed flow rate, used for checking the alignment of the water jet.

This is because it is preferable to greatly reduce the water feed flow rate and pressure when checking the alignment of the jet, so as to have a thin coherent jet, that is to say substantially non-divergent, output by the focusing tube, thereby greatly facilitating the alignment check by reducing in particular the risks of observation areas.

The invention also provides a method for checking the alignment of the jet in a water-jet coupling system, which method consists:

in fixing to the outlet of the focusing tube a cylindrical tubular end-piece having, at its downstream end, an annular element centered on the axis of the tube and having an internal diameter equal to that of the tube;

in supplying the cutting system with water at a reduced pressure and with a reduced flow rate, without addition of abrasive powder, in order to obtain a coherent and substantially non-divergent water jet at the outlet of the tube; and in observing any water rebound on the annular element in the event of a misalignment of the water jet.

In one example of the implementation of the method according to the invention, in which the system is fed at a pressure of about 2500 bar for cutting and with a flow rate of about 4.7 liters per minute, the feed pressure is reduced to about 700 bar and the flow rate to about 0.22 liters per minute in order to check the alignment of the jet.

Such pressure and flow rate values make it possible, in this example, to obtain at the outlet of the tube a water jet that is fine enough and non-divergent.

BRIEF DESCRIPTION OF THE DRAWINGS

Other advantages and features of the invention will become apparent on reading the following description given by way of nonlimiting example and with reference to the appended drawings in which.

DESCRIPTION OF THE PREFERRED EMBODIMENTS

Figure 1:
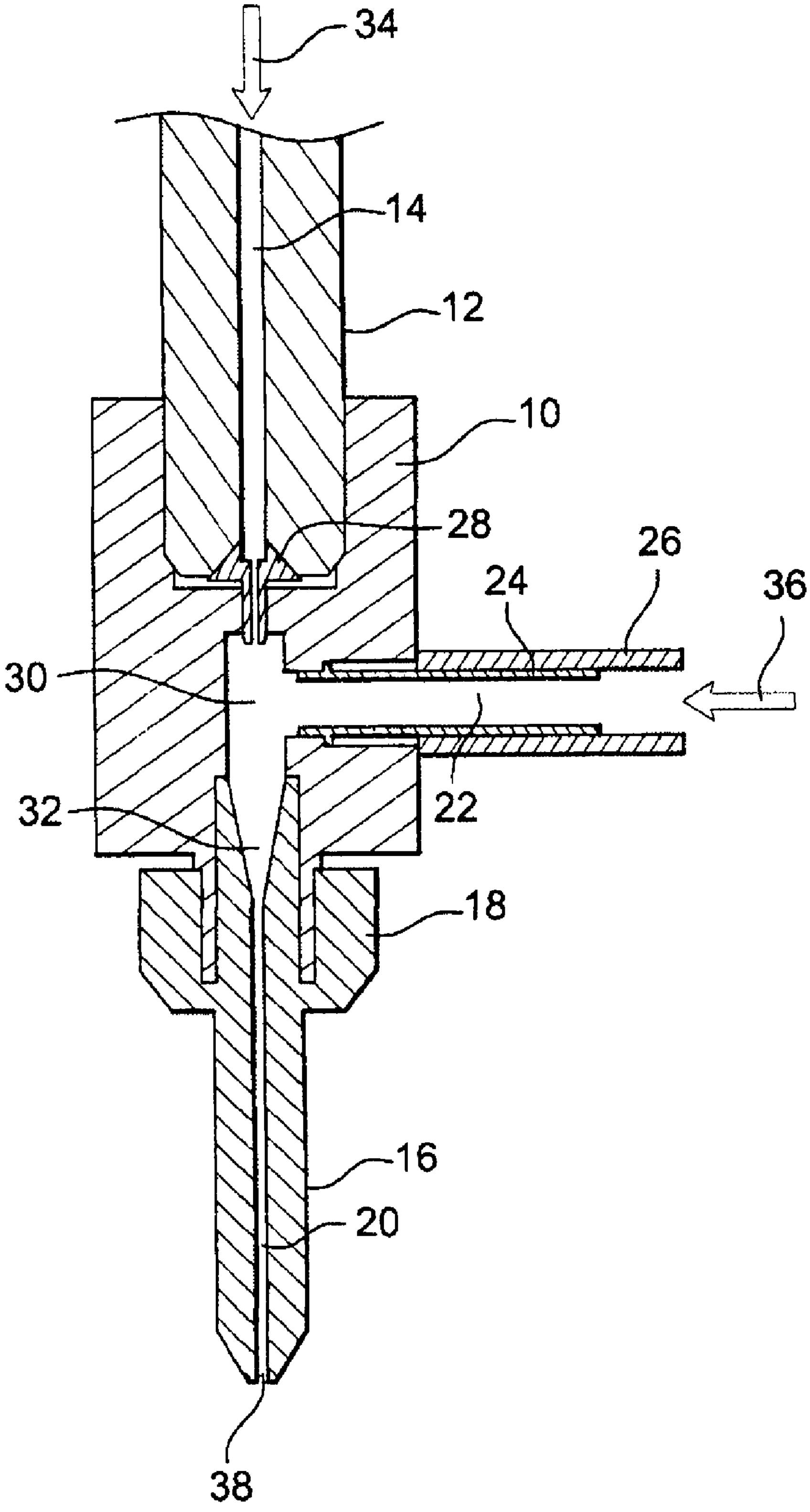
FIG. 1 is a schematic view in axial cross section of a water-jet cutting system using an abrasive-laden water jet.

Referring firstly to FIG. 1, this shows the head of an abrasive water-jet cutting system, comprising a body 10 supporting the downstream end of a collimating tube 12 that has an internal channel 14, and the upstream end of a focusing tube 16, which is fitted onto this body 10 thanks to a clamping nut 18 and includes an internal channel 20, the inlet 32 of which has a funnel shape. The body 10 also includes a lateral inlet 22 provided with a coupler 24 to which an abrasive powder feed 26 is connected. A water-jet-forming nozzle 28 is housed in the body 10 at the outlet of the collimating tube 12 and emerges in a mixing chamber 30, which is formed in the body 10 and communicates with the inlet 32 of the internal channel 20 of the focusing tube 16 and with the lateral inlet 22.

In operation, pressurized water, shown symbolically by the arrow 34, flows into the internal channel 14 of the collimating tube 12 until it encounters the nozzle 28. The water leaves this nozzle in the form of a very powerful jet, the passage of which through the mixing chamber at high velocity causes abrasive powder to be sucked in by the venturi effect, the flow of powder being shown symbolically by the arrow 36. The water/abrasive powder mixture then passes into the inlet 32 of the internal channel 20 of the focusing tube, where the jet is accelerated before being blasted out via the outlet 38 of this focusing tube.

The jet alignment checking device according to the invention comprises (FIG. 2) a tubular end-piece 40 that is fitted onto the downstream part of the focusing tube 16 of the cutting system shown in FIG. 1 and includes an internal cylindrical channel 42 of larger diameter than the diameter of the internal channel 20 of this focusing tube. An internal annular shoulder 44 is formed on the downstream end of the tubular end-piece 40 and defines a cylindrical outlet orifice 48 of the internal channel 42. The internal diameter of this outlet orifice 48 is equal to the diameter of the internal channel 20 of the focusing tube 16. Furthermore, the internal channels 20 and 42 and the cylindrical outlet 48 lie on the same axis. Moreover, the tubular end-piece 40 also includes an opening or window 46 formed in its cylindrical wall, near its downstream end, this opening emerging in the channel 42 of the end-piece and having dimensions that are larger than the diameter of this channel.

The principle of operation and use of this checking device is as follows: the abrasive powder feed is closed off and the water feed pressure and flow rate of the cutting system are reduced so as to obtain a sufficiently fine and coherent water jet, that is to say one in which there is substantially no divergence on leaving the focusing tube 16. To reduce the water flow rate, the entire water feed flow may simply be passed into a duct equipped with a flow control valve, set to the desired flow rate, this duct being branched off the feed duct of the cutting system and being connected to it via a shutoff valve operating in on/off mode, which may for example be controlled by an air pressure. The end-piece 40 is fitted onto the focusing tube in accordance with FIG. 2, and then this cutting system is fed with water at the reduced flow rate. The water jet 54 then flows through the internal channel 20 of the focusing tube 16 and then through the internal channel 42 of the tubular-end piece 40 as far as its outlet 48.

If the water jet is correctly aligned, it passes through the outlet orifice 48 without appreciably rebounding on the shoulder 44.

Figure 2:
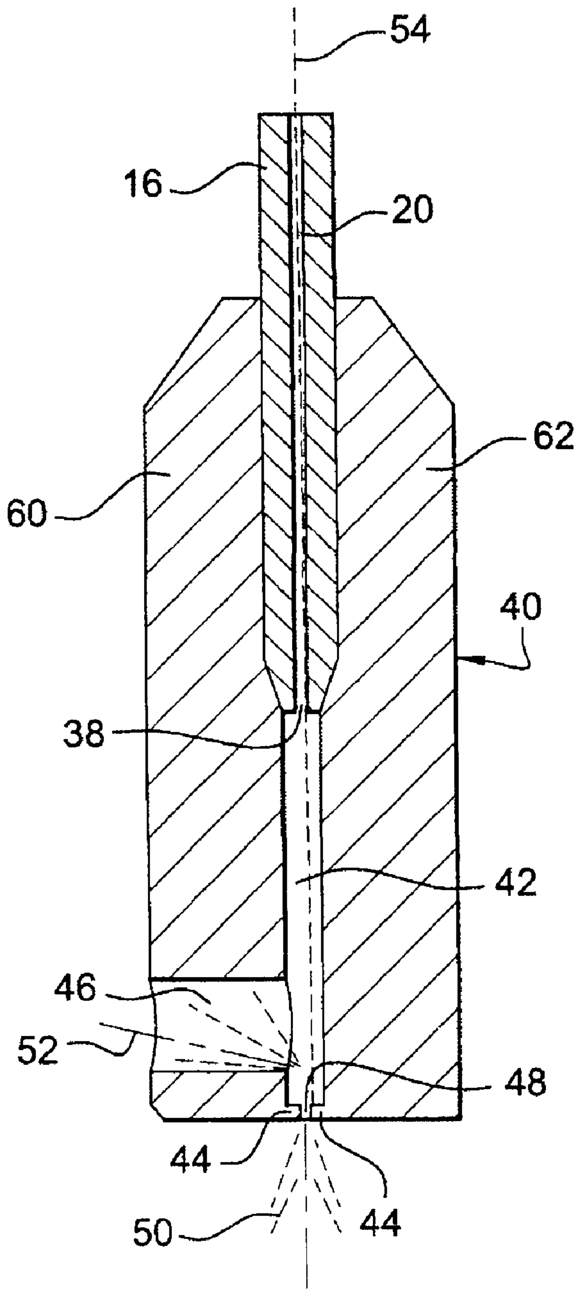
FIG. 2 is a schematic view in axial cross section of a device according to the invention, in the case of misalignment of the water jet.

However, if the water jet 54 is misaligned, as illustrated in FIG. 2, a relatively large portion of the water jet inevitably comes into contact with the annular shoulder 44, giving rise to water rebound 50 at the outlet 48 and emerging via the window 46.

If the misalignment of the water jet is very considerable, it may happen that this jet is reconstructed by repeatedly rebounding off the wall of the internal channel 42 and may end up resembling a correctly aligned jet arriving at the outlet 48. The window 46 makes it possible to distinguish this situation from the case in which the jet is correctly aligned owing to a larger expulsion of water via this window.

The alignment check using the device according to the invention therefore consists in observing possible rebounds 50 and 52 characterizing poor alignment.

If the check demonstrates that the jet is poorly aligned, and therefore that the axis of the jet-forming nozzle 28 is misaligned with the axis of the focusing tube 16, the nozzle 28 may be removed from the system and replaced with a new nozzle, or possibly refitted after being cleaned, if the misalignment was caused by the presence of undesirable bodies in the housing for this nozzle 28.

Figure 3:
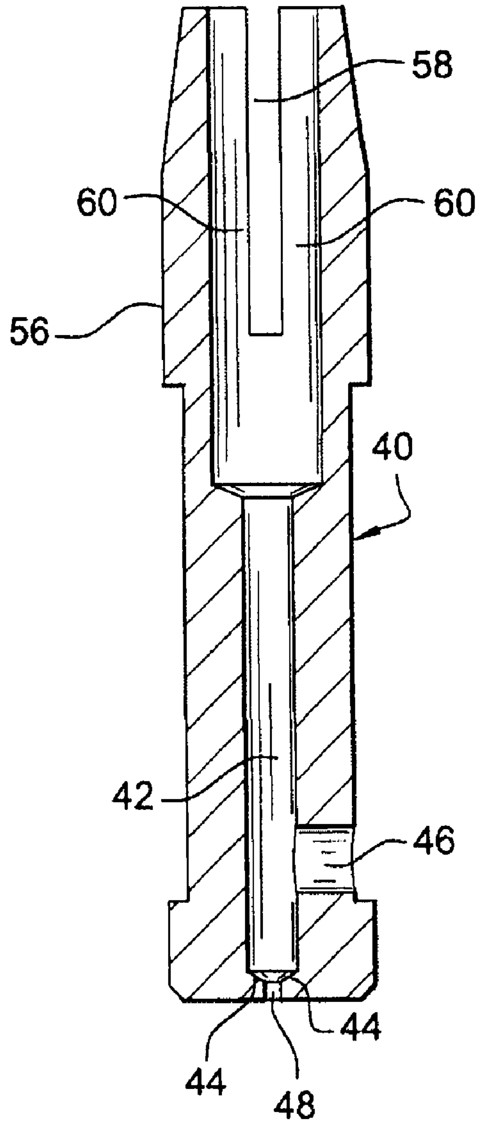
FIG. 3 is a partial schematic view in axial cross section on a larger scale of an exemplary embodiment of the device according to the invention.

FIG. 3 shows an exemplary embodiment of the end-piece 40 designed to cooperate with a clamping nut (not shown) which is screwed onto a threaded part 56 of the outer surface of the end-piece, near its upstream end. Apart from the internal channel 42, the annular shoulder 44 and the window 46 already mentioned, the end-piece 40 includes an upstream part 58 with an axial slot, which defines two substantially semicylindrical and symmetrical jaws 60.

The end-piece 40 is fitted onto the cutting head by inserting the downstream part of the focusing tube 16 between the two jaws 60 and then tightening the clamping nut on the part 56 of the end-piece until the focusing tube is clamped sufficiently by the jaws 60 to ensure that the device is properly held on the head of the cutting system.

In general, the tubular end-piece 40 of FIGS. 2 and 3 constitutes one example of a means for positioning an annular element 44 at a certain distance from and along the axis of the focusing tube 16. Other means may be used for placing the annular element along the axis of the tube 16, these means being technical equivalents of the means described and shown.

The invention claimed is:

1. A device for checking the alignment of a water jet in a water-jet cutting system which comprises a pressurized water inflow, a nozzle for forming the water jet, said nozzle opening into an abrasive powder intake chamber, and a focusing tube mounted on the outlet of this chamber, this focusing tube having an internal cylindrical channel of constant diameter for passage of the water jet, which device includes means for positioning an annular element on the outlet of the focusing tube, at a certain distance from this outlet and aligned with respect to the axis of the focusing tube, this annular element having an internal diameter equal to that of the internal channel of the focusing tube.

2. The device as claimed in claim 1, wherein the annular element is formed by the downstream end of a cylindrical tubular end-piece fixed, for example screwed or fitted, to the downstream end of the focusing tube.

3. The device as claimed in claim 2, wherein this tubular end-piece includes an internal cylindrical channel for passage of the water jet, this channel having a diameter greater than that of the internal channel of the focusing tube.

4. The device as claimed in claim 3, wherein the internal channel of the end-piece terminates at its downstream end in an internal shoulder forming the tubular element.

5. The device as claimed in claim 3 or 4, wherein the tubular end-piece includes at least one window formed in its cylindrical wall near its downstream end.

6. The device as claimed in one of claims 1 to 4, which also includes means for reducing the water feed pressure and means for reducing the water feed flow rate, used for checking the alignment of the water jet.

7. A method for checking the alignment of the jet in a water-jet coupling system of the type described in one of the preceding claims, which method consists:

in fixing to the outlet of the focusing tube a cylindrical tubular end-piece having, at its downstream end, an annular element centered on the axis of the tube and having an internal diameter equal to that of the tube;

in supplying the cutting system with water at a reduced pressure and with a reduced flow rate, without addition of abrasive powder, in order to obtain a coherent and substantially non-divergent water jet at the outlet of the tube; and in observing any water rebound on the annular element in the event of a misalignment of the water jet.

8. The method as claimed in claim 7, wherein, when the system is fed at a pressure of about 2500 bar for cutting and with a flow rate of about 4.7 liters per minute, the feed pressure is reduced to about 700 bar and the flow rate to about 0.22 liters per minute in order to check the alignment of the jet.

* * * * *